(12) United States Patent
Loftstrom

(10) Patent No.: US 8,733,187 B2
(45) Date of Patent: May 27, 2014

(54) PIPE INSPECTION SYSTEM

(75) Inventor: Dan Loftstrom, Seattle, WA (US)

(73) Assignee: Steady Flux, Inc, Seattle, WA (US)

( * ) Notice: Subject to any disclaimer, the term of this patent is extended or adjusted under 35 U.S.C. 154(b) by 127 days.

(21) Appl. No.: 13/450,052

(22) Filed: Apr. 18, 2012

(65) Prior Publication Data

US 2013/0276558 A1  Oct. 24, 2013

(51) Int. Cl.
*G01N 21/88*  (2006.01)

(52) U.S. Cl.
USPC .......................................................... 73/865.8

(58) Field of Classification Search
None
See application file for complete search history.

(56) References Cited

U.S. PATENT DOCUMENTS

| | | | |
|---|---|---|---|
| 4,991,006 A | * | 2/1991 | Wood .............................. 348/84 |
| 5,577,864 A | * | 11/1996 | Wood et al. ................ 405/184.2 |
| 2002/0166396 A1 | * | 11/2002 | McGrew ...................... 73/865.8 |

OTHER PUBLICATIONS

"Turbinate," Turbinate International B.V., http://www.turbinate.com/page.php?page=1; 1 page, Jul. 31, 2012.

* cited by examiner

*Primary Examiner* — Robert R Raevis

(57) ABSTRACT

A pipe inspection system and method for accessing and inspecting a feeder tube extending from a larger header pipe at an angle are disclosed. A pipe inspection tool including a head piece and a delivery tube are positioned within the header pipe and aligned with the feeder tube using cameras or other alignment means. The head piece includes a jack that presses the head piece against the interior surface of the header pipe at the feeder tube to create a sufficient seal to deliver a PIG or another pipe inspection device to the feeder tube.

12 Claims, 5 Drawing Sheets

PIPE INSPECTION SYSTEM

FIELD OF THE INVENTION

The present disclosure is directed to a pipe inspection system for accessing and inspecting a small diameter pipe that branches from a large diameter pipe at an angle.

BACKGROUND OF THE INVENTION

Many industries rely on piping of various diameters to direct fluids, such as air, water, or oil to and from buildings or refineries. Some of this piping is located in environments that are difficult to access for inspection or repair. A common inspection tool is the pipe inspection gauge, or "PIG," that can be inserted into a pipe and moved along the interior or the pipe and can have a camera or other telemetry tools on board to inspect the pipe. The pipe geometry itself, however, can make inspection difficult even for a sophisticated PIG. Some angles are not negotiable for PIGs. Also, PIGs are not capable of navigating pipe sections of significantly differing diameters. One approach has been to cut into the pipe and deliver PIGs through the cut or to otherwise inspect the pipes through the cut, and then to patch up the cut. This practice, however, is expensive to perform, takes a facility offline for a relatively long time, and poses the risk that the patch will fail.

SUMMARY OF THE INVENTION

The present disclosure is directed to a pipe inspection tool for a header pipe having a feeder tube extending from the header pipe. The pipe inspection tool includes a head piece having a tubular body defining a central axis and having a proximal opening at a first end and a distal opening at an angle to the central axis. The distal opening is configured to engage the feeder tube at an interior surface of the header pipe. The inspection tool also includes a camera or another sensing device mounted to the head piece and configured to provide a field of view from a position from within the head piece looking outward through the distal opening. The field of view is centered within the distal opening to facilitate alignment of the feeder tube coupler with the feeder tube. The tool also has one or more jacks coupled to the head piece and configured to press the head piece against the interior surface of the header tube to sealably couple the head piece with the feeder tube.

In other embodiments the present disclosure is directed to a method of inspecting a feeder tube extending at an angle from a header pipe by introducing a pipe inspection tool into the header pipe, sealably coupling the pipe inspection tool with the feeder tube, and introducing a PIG to the feeder tube through the inspection tool.

The present disclosure is also directed to a pipe inspection tool including a head piece having a longitudinal axis and being sized to fit within a pipe having a first diameter, and a tube coupler carried by the head piece and configured to sealably couple with a tube having a second diameter smaller than the first diameter. The tube coupler is oriented at an angle with respect to the longitudinal axis of the head piece. The inspection tool can also include a means for pressing the tube coupler against an interior surface of the pipe with the tube coupler aligned with the tube.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
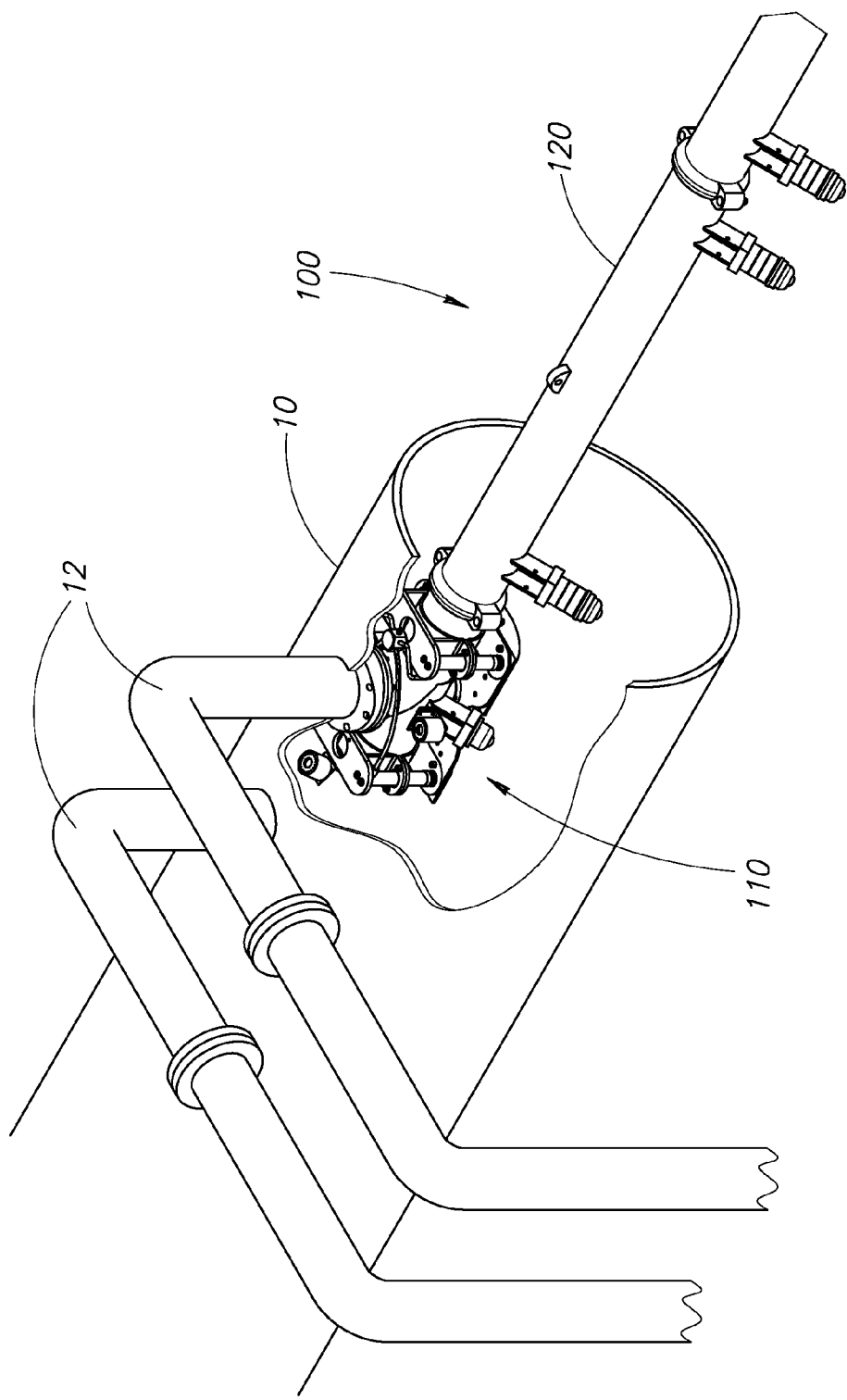
FIG. 1 depicts a pipe inspection device in position relative to a header pipe and feeder tubes to be inspected by the inspection device according to embodiments of the present disclosure.

FIG. 1 illustrates a pipe inspection tool 100 according to embodiments of the present disclosure. The inspection tool 100 includes a head piece 110 and a delivery tube 120. The inspection tool 100 is used to inspect a header pipe 10 having feeder tubes 12 extending from the header pipe 10 at an angle. In general, the feeder tubes 12 have a smaller diameter than the header pipe 10. The systems and methods of the present disclosure can be used in a variety of environments involving pipes of different diameter, some of which are commonly referred to as header pipes and feeder tubes, and some of which are not necessarily referred to as such. For purposes of clarity and brevity, the terms "header pipe" and "feeder tube" are used to refer to a large diameter pipe and a smaller diameter pipe, respectively without loss of generality. The feeder tubes 12 can extend from the header pipe 10 at virtually any angle; in this embodiment, the angle is approximately 90°. The tool 100 can be introduced to the header pipe 10 and aligned with the feeder tube 12. The head piece 110 is then pressed against the interior surface of the header pipe 10 with a hydraulic or mechanical jack to form a seal with the feeder tube 12. A PIG can then be delivered through the delivery tube 120, through the head piece 110, and into the feeder tube 12.

Figure 2:
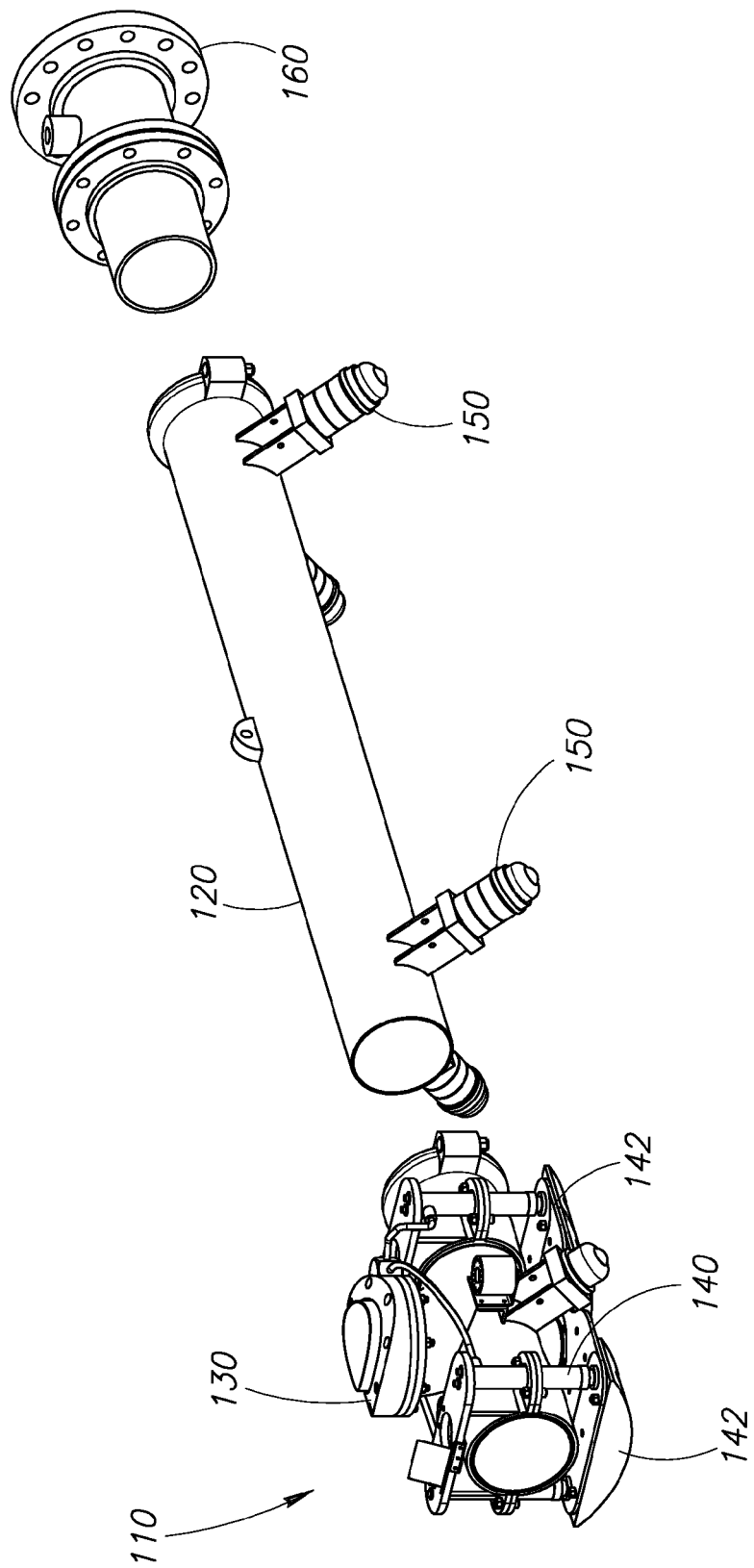
FIG. 2 illustrates a pipe inspection device having a head piece and a delivery tube according to embodiments of the present disclosure.

FIG. 2 illustrates an inspection tool 100 according to embodiments of the present disclosure, including a head piece 110 and a delivery tube 120. The head piece 110 includes a tube coupler 130 on a side of the head piece 110. The head piece 110 can have a longitudinal axis parallel with the delivery tube 120, and the tube coupler 130 can be oriented at an angle relative to the longitudinal axis of the head piece 110, such as a 90° angle. The tube coupler 130 can be shaped to conform to an interior surface of the header pipe 10 shown in FIG. 1. In some embodiments, the tube coupler 130 can have a curved surface configured to conform to a curved surface such as the inner surface of the header pipe 10. In other embodiments the tube coupler can have a curved shape of a different radius, or even a flat profile, depending on the shape of the surface to which the tube coupler 130 is to engage.

The tube coupler 130 can be made of a resilient member to facilitate forming a seal. In one version, the tube coupler includes a resilient gasket configured to form a seal between the head piece and an opening of a feeder tube within the header pipe.

The head piece 110 can also include a jack 140 configured to press the tube coupler 130 against the interior surface of the header pipe 10. The jack 140 can include bumpers 142 shaped to engage the interior surface of the header pipe 10 opposite the tube coupler 130. In embodiments in which the inspection tool 100 is for use within a cylindrical header pipe 10, the radius of the bumpers 142 and the tube coupler 130 can be the same. In other embodiments the bumpers 142 and the tube coupler 130 can be designed to engage with structures having disparate shapes and surface characteristics and can therefore be modified accordingly.

The feeder tubes may be located at any distance from an access point in the larger header pipe. Accordingly, the delivery tube 120 may be made to be variable in length, accommodating a number of segments coupled together to form the delivery tube. In addition, the delivery tube may attach to the headpiece in a location that leaves the delivery tube positioned centrally within the header pipe 10. In this situation, particularly with longer delivery tube runs, it is desirable to include supports for the delivery tube.

As seen in FIG. 2, the inspection tool 100 includes supports 150 that can help to maintain the position of the head piece 110 and the delivery tube 120 within the header pipe 10. The supports 150 can comprise arms that extend radially from the head piece 110 or the delivery tube 120 or both. The supports 150 can include casters that can roll or slide along the interior surface of the header pipe 10. In some versions, the supports may be remotely operable to cause them to selectively raise and lower the height of the delivery tube and the headpiece. The supports can extend from the delivery tube 120 or the head piece 110 in any direction to support the head piece 110 within the header pipe 10. In different installations the feeder tubes 12 extend from the header pipe 10 in different directions. In some embodiments the supports 150 can be built for a specific installation. In other embodiments the inspection tool 100 can include supports 150 extending in various directions and therefore capable of use with feeder tubes 12 extending in any direction. For example, the inspection tool 100 can include three supports 150, each spaced apart angularly by 120° around the tool, or four supports 150, each spaced apart angularly by 90°. This may be desirable in installations where the direction of the feeder tube 12 is not known, or for when an installation has multiple feeder tubes extending at different angles from the header pipe 10.

The inspection tool 100 can also include a spool coupler 160 attached to the delivery tube 120 opposite the head piece 110. The spool coupler 160 can couple the delivery tube 120 to a conventional PIG delivery device (not shown) or another suitable inspection system. The spool coupler 160 can be coupled directly to the head piece 110 if the feeder tube 12 is near an opening in the header pipe 10.

Figure 3:
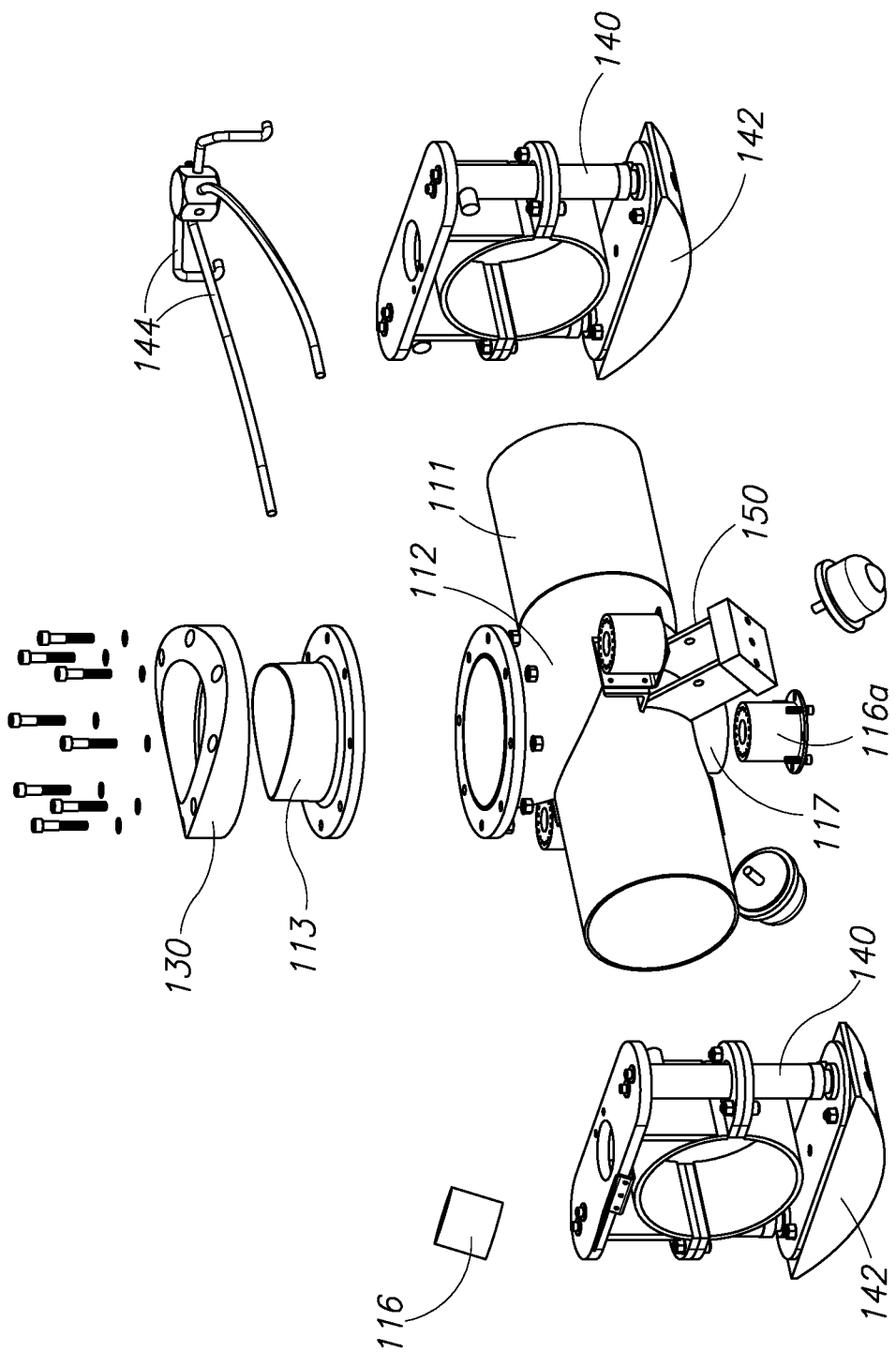
FIG. 3 is an exploded view of the pipe inspection device of FIGS. 1 and 2 according to embodiments of the present disclosure.

FIG. 3 is an exploded view of the head piece 110 of the pipe inspection tool 100 according to embodiments of the present disclosure. The head piece 110 can be made of a first pipe section 111 that is oriented generally parallel with the central longitudinal axis of the head piece 110. As shown, the first pipe section 111 is cylindrical in shape and therefore the longitudinal axis extends through the center of the cylinder. The first pipe section 111 can be coupled to a second pipe section 112. The first and second pipe sections may be integrally formed as one continuous tube, or may be formed as separate sections joined together. In either case, the first pipe section includes a first, proximal opening at one end that is sized and configured to receive a PIG, as discussed below. Within the head piece, the internal channel forms an angle, preferably curved, to direct the moving pig from a first path of travel aligned with the longitudinal axis to a second path of travel angularly offset by the orientation of the second pipe section. The second pipe section forms a second, distal opening through which the PIG may travel, ultimately allowing it to enter a header pipe.

The shape of the second pipe section 112 is chosen based on the angle at which the feeder tube 12 extends from the header pipe 10. In the embodiment shown, the angle is 90°, but virtually any other angle is possible. The second pipe section 112 can be an elbow junction. The head piece 110 can also include a third pipe section 113 that extends from the second pipe section 112 to accommodate a longer reach if desirable. The feeder tube coupler 130 is shown coupled to the third pipe section 113. The feeder tube coupler 130 and the third pipe section 113 can be bolted, welded, or otherwise attached to the second pipe section 112. The fluid circuit for delivering the PIG to the feeder tube 12 includes the first pipe section 111, the second pipe section 112, and the feeder tube coupler 130. If necessary, the circuit can also include a delivery tube 120 and a third pipe section 113.

The head piece 110 can include a support section 114 coupled to the second pipe section 112. The support section 114 can be generally parallel with the first pipe section 111 and, the primary function is to provide a surface for attaching a hydraulic jack, as described below. In one version, the support section can be configured as a pipe section having roughly the same diameter as that of the first pipe section 111. In a preferred version, the support section 114 is not in fluid communication with the fluid circuit of the head piece 110 and therefore serves only as a support shelf. Alternatively, the support section 114 can be in selective fluid communication with the fluid circuit by a valve (not shown) between the second pipe section 112 and the support section 114. When the valve is closed the support section 114 does not communicate fluidly with the fluid circuit, but the valve can be opened to release pressure or to permit the PIG to pass through the head piece 110. Supports 150 can be mounted to the support section 114 or to other portions of the head piece 110. The support section 114, the first pipe section 111, and the third pipe section 113 can form a T-shaped structure.

The head piece 110 can include a sensing device, such as one or more cameras 116a-c, mounted at various positions. In other embodiments the sensing device can be an ultrasound device or a mechanical sensing device, or any other suitable sensing device. The cameras 116a-c can be oriented in any suitable direction to allow the operator to observe the interior of the header pipe 10 in order to align the feeder tube coupler 130 to the feeder tube 12. In some embodiments, one of the cameras 116a can be placed at a center of the angled tube and oriented to look outwardly from the feeder tube coupler 130 to more easily align the feeder tube coupler 130 with the feeder tube 12. As best seen in FIG. 3, a camera 116a can be mounted through a channel 117 passing through a portion of the second pipe section 112. In this configuration, the camera 116a is mounted substantially flush with or recessed slightly below the interior sidewall of the first pipe section 111, oriented to view the image diametrically opposite and through the opening of the second pipe section 112 without significantly obstructing the path through the head piece 110. Other cameras 116b, 116c can be mounted elsewhere around the head piece 110 to assist with maneuvering the head piece 110 within the header pipe and with locating the feeder tube 12.

The head piece 110 includes one or more jacks 140 having bumpers 142 that engage the header pipe 10 opposite to the feeder tube coupler 130 to press the feeder tube coupler 130 to the interior surface of the header pipe 10 to sealably couple the head piece 110 to the feeder tube 12. The head piece 110 can include hydraulic lines 144 to supply hydraulic pressure to the jacks 140. Hydraulic jacks are one example mechanism that can be used to achieve the necessary pressure to seal the feeder tube coupler 130 to the feeder tube 12. In other embodiments an inflatable bladder can be used. In still other embodiments the head piece 110 can attach to the interior surface of the header pipe 10 and pull the feeder tube coupler 130 toward the feeder tube 12. The header pipe 10 or the feeder tube 12 can be built to include a mechanism to facilitate the attachment, such as a threaded hole or a clip or some other mechanism means by which the head piece 110 can attach to the header pipe 10. Attaching and pulling may be desirable in cases where the header pipe 10 is much larger than the feeder tube 10 such that an opposite surface is not readily available for the jacks 140 to engage.

There are many factors that determine how much pressure is necessary to create a proper seal to the feeder tube 12. In some embodiments, such as header/feeder pipes used by oil refineries, the pressure in the header pipe can be up to 600 psi. So in order to create an adequate seal to the feeder tube 12, the feeder tube coupler 130 must withstand the required pressure with an appropriate safety margin to create a seal adequate to deliver a PIG or other inspection devices through into the feeder tube and back.

Figure 4:
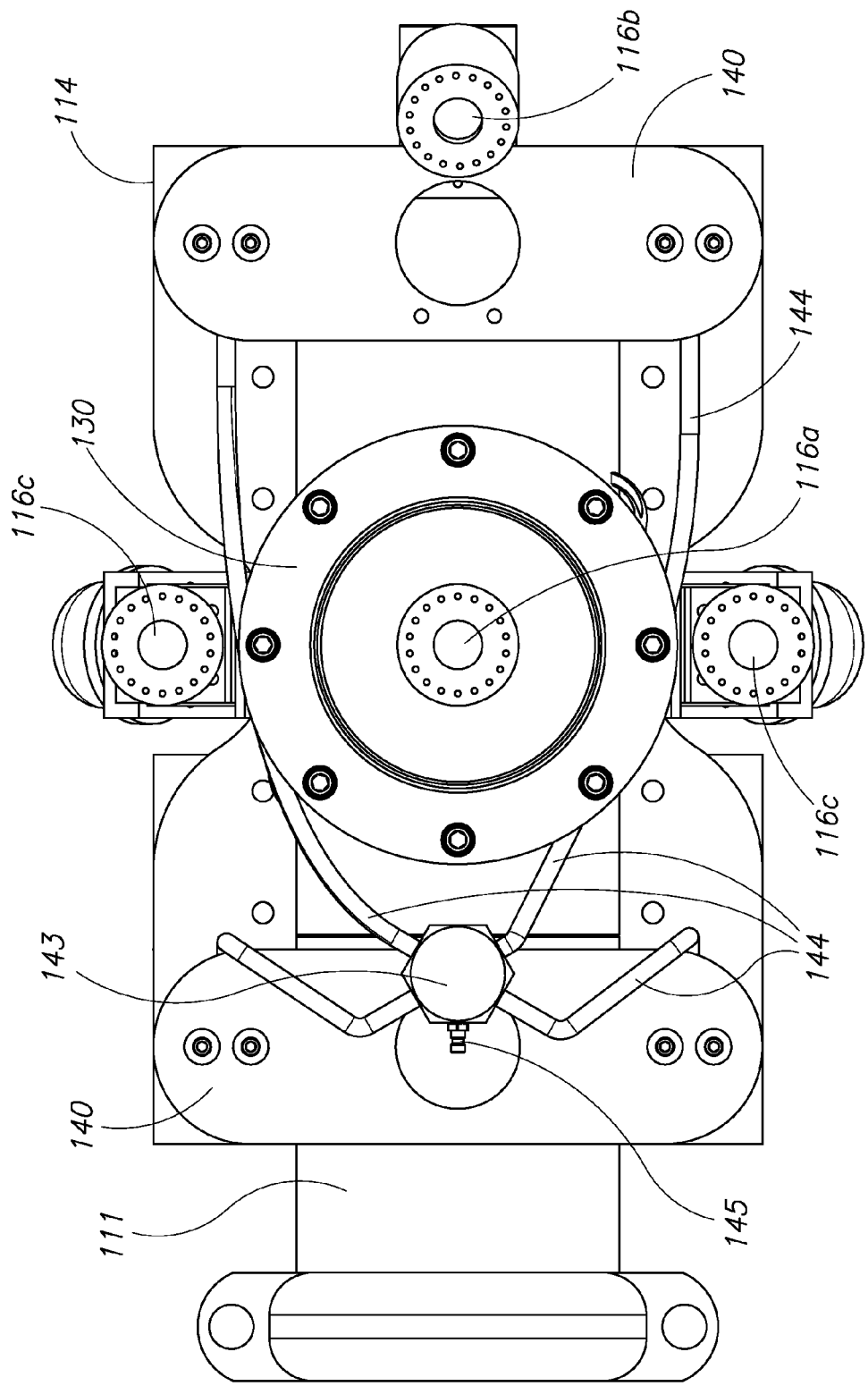
FIG. 4 is a top plan view of the head piece of the pipe inspection tool according to embodiments of the present disclosure.

FIG. 4 is a top plan view of the head piece 110 according to embodiments of the present disclosure. In this embodiment, there are four cameras 116: one camera 116a positioned at the center of the second pipe section 112 and feeder tube coupler 130, one camera 116b positioned in line with the longitudinal axis of the head piece 110, and two cameras 116c spaced laterally from the center camera 116a. Other camera positions are possible, and any suitable number of cameras can be used based on the particular needs of a given installation. FIG. 4 also shows the hydraulic lines 144 for the jacks 140. The lines can be connected to a valve 143 having a purge port 145 to distribute the hydraulic pressure to the jacks 140. The head piece 110 can have two jacks 140 positioned on either side of the feeder tube coupler 130. In other embodiments, the head piece 140 can include a single jack 140 aligned with the feeder tube coupler 130, or offset therefrom. In still further embodiments, the head piece 110 can include three or more jacks 140.

Figures 5A, 5B:
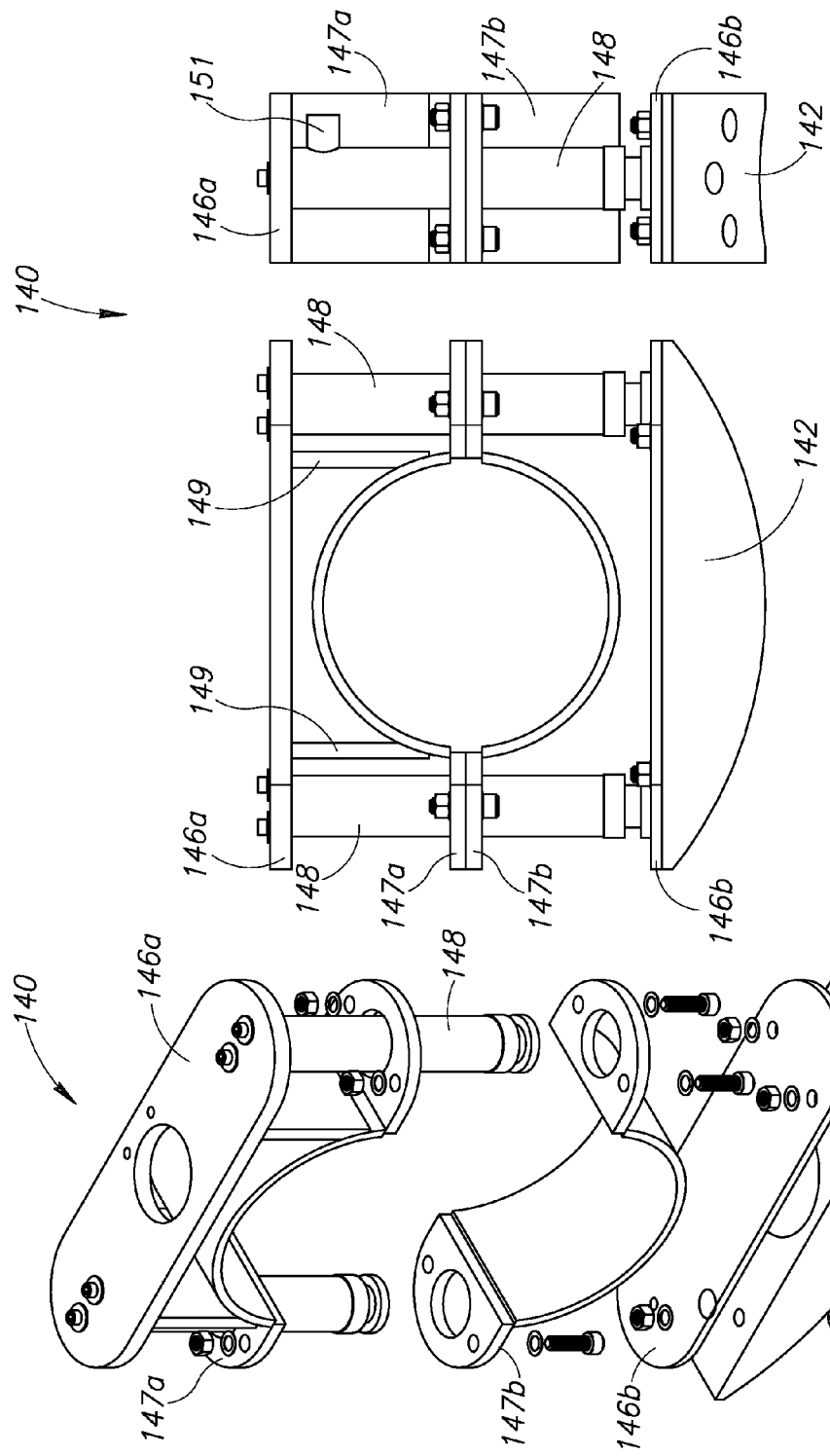
FIG. 5A is an exploded view of a jack for positioning the head piece relative to the feeder tube to be inspected according to embodiments of the present disclosure.
FIG. 5B is orthogonal side and front views of the jack of FIG. 5B in an assembled state.

FIG. 5A is an exploded illustration of a jack 140 for the pipe inspection tool 100 according to embodiments of the present disclosure. The jack 140 can include first and second endplates 146a, 146b, first and second tube engaging members 147a, 147b, bumpers 142, and extendible arms 148. FIG. 5B shows front and side views of these same components in an assembled configuration with the tube couplers 147a, 147b bolted together, and with the arms 148 coupled to the end plates 146a, 146b. The first tube engaging member 147a can be attached to the first end plate 146a via a connecting member 149. The arms 148 can be fixedly attached to the end plates 146a, 146b, and can pass through holes in the tube engaging members 147a, 147b. The bumper 142 can be fixed to the second end plate 146b. When the jack 140 is actuated the arms 148 extend and cause the second end plate 146b to move away from the second tube engaging member 147b to press the feeder tube coupler 130 against the feeder tube 12. The jack 140 can be hydraulic and can receive pressurized fluid from the lines 144 shown in FIG. 4 through a port 151. The pressure necessary to create the seal between the feeder tube coupler 130 and the feeder tube 12 can be provided by other equivalent mechanisms, such as an inflatable bladder, solenoid, scissor jack, or another mechanical or electromechanical device.

While the preferred embodiment of the invention has been illustrated and described, as noted above, many changes can be made without departing from the spirit and scope of the invention. For example, in place of cameras to position the head piece other telemetry equipment can be used, including sonar or a mechanical sensor. Also, the angle at which the feeder tube extends from the header pipe can be virtually any angle. The environment in which the inspection tool of the present disclosure is used can be any environment having a pipe or other component that is difficult to access and where PIGs cannot be used. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A pipe inspection tool for a header pipe having a feeder tube extending from the header pipe, the pipe inspection tool comprising:
   a head piece having a tubular body defining a central axis and having a proximal opening at a first end and a distal opening at an angle to the central axis;
   the distal opening being configured to engage the feeder tube at an interior surface of the header pipe; and
   a camera mounted to the head piece and configured to provide a field of view from a position from within the head piece looking outward through the distal opening, the field of view further being centered within the distal opening to facilitate alignment of the feeder tube coupler with the feeder tube; and
   a jack coupled to the head piece and configured to press the head piece against the interior surface of the header tube to sealably couple the head piece with the feeder tube.

2. The pipe inspection tool of claim 1 wherein the head piece comprises a first generally straight pipe section and a second, angled pipe section.

3. The pipe inspection tool of claim 1 wherein the jack is a hydraulic jack.

4. The pipe inspection tool of claim 1, further comprising a resilient bumper coupled to the jack and configured to engage the interior surface of the header pipe.

5. The pipe inspection tool of claim 1, further comprising support members extending from the pipe inspection tool and configured to maintain the position of the head piece relative to the center of the header pipe.

6. The pipe inspection tool of claim 5, further comprising casters on the support members.

7. The pipe inspection tool of claim 5 wherein the support members comprise at least three support members spaced apart radially relative to the central axis.

8. The pipe inspection tool of claim 1, further comprising a delivery tube attached to the proximal opening and configured to allow delivery of a PIG through the head piece and into the feeder tube.

9. A method of inspecting a feeder tube extending at an angle from a header pipe, the method comprising:
   providing a pipe inspection tool in accordance with claim 1;
   introducing the pipe inspection tool into the header pipe;
   sealably coupling the pipe inspection tool with the feeder tube; and
   introducing a PIG to the feeder tube through the inspection tool.

10. The method of claim 9, further comprising actuating a jack to press against the interior surface of the header pipe to sealably couple the pipe inspection tool with the feeder tube.

11. The method of claim 9, further comprising optically scanning the interior surface of the header pipe with a camera to align the feeder tube coupler with the feeder tube.

12. The method of claim 9, further comprising supporting the inspection tool within the head piece.

* * * * *